UNITED STATES PATENT OFFICE.

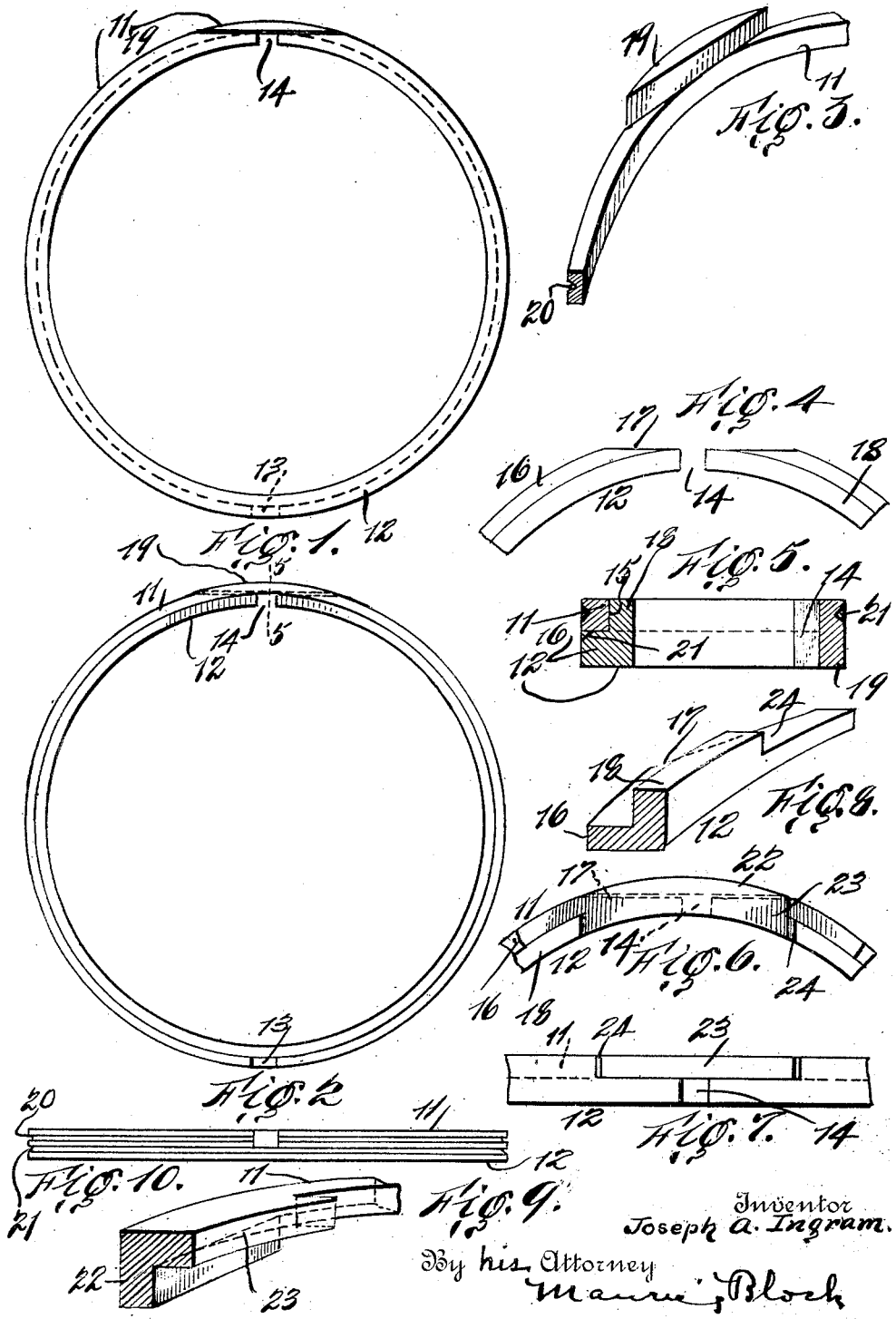

JOSEPH A. INGRAM, OF EAST ORANGE, NEW JERSEY.

PISTON-RING.

1,374,852. Specification of Letters Patent. Patented Apr. 12, 1921.

Application filed September 25, 1919. Serial No. 326,159.

*To all whom it may concern:*

Be it known that I, JOSEPH A. INGRAM, a citizen of the United States of America, residing at East Orange, Essex county, State of New Jersey, have invented certain new and useful Improvements in Piston-Rings, of which the following is a full, clear, and exact description.

This invention relates to improvements in piston rings, one of the objects being to provide a two-piece triple seal piston ring, that is to say, a ring having the joints of both rings sealed to prevent leakage or loss of compression in a motor-cylinder, and also to prevent the passage of oil into the firing chamber, thereby preventing to a large extent carbonization. My improved piston-rings will tend to increase the power of a motor due to the prevention of loss of compression, which is prevented by the double sealing of the joints of the ring members.

I will now proceed to describe my invention in detail, the novel features of which I will point out in the appended claims, reference being had to the accompanying drawing, forming part hereof, wherein—

Figure 1 is a face view of the ring assembly;

Fig. 2 is a similar view of the assembly when turned over or reversed;

Fig. 3 is an enlarged fragmentary perspective view of a portion of one of the ring-members;

Fig. 4 is a fragmentary view illustrating the split portion of the other ring-member;

Fig. 5 is an enlarged sectional view, the section being taken on a line 5—5 in Fig. 2;

Figs. 6, 7, 8 and 9 are fragmentary detail views of a modified form of joint; and Fig. 10 is an edge view of the ring assembly.

My improved piston-packing consists of (in this instance) two superimposed expansible ring-members 11 and 12 (see Fig. 10), said rings being rendered expansible by being split as at 13 and 14, respectively. To assemble the ring members, so as to produce a substantially flush peripheral or wearing surface, I provide the upper ring member 12 with an annular channel 15, said channel being proportioned to receive the ring-member 11 as indicated in Fig. 5. One of the objects of my improvement is to seal the gaps of the joints 13 and 14 to prevent leakage. When the members 11 and 12 are assembled the split portion or gap 13 of ring 11 will be positioned diametrically opposite the gap 14 in member 12 as indicated in Figs. 1 and 2. The annular ledge 16, produced, by forming the channel 15, will seal the gap 13 in ring 11. As can be seen in Fig. 4, the ledge 16 on the ring-member 12 is flattened as at 17 tangential to the annular flange portion 18 of the said ring to permit of the positioning of a lip 19 carried by the ring-member 11. As can be seen, the ring 11 consists of a band-member having the said lip 19, the combined depth of said band and lip being equal to the depth of the ring or packing member 12. The band portion of the ring member will be located in the channel 15 of the packing or ring-member 12; the lip 19 being positioned over the flattened portion 17 of said ring-member 12 as illustrated. The lip 19 effectually seals the gap 14 in ring-member 12 as can be seen in Fig. 5. The purpose of the lip 19 and coöperating flattened portion of the ring-member 12 is to prevent the shifting of the said ring-members, or in other words, to prevent either member from rotating to an extent that would cause the gaps 13 and 14 to aline or register one with the other. The lip 19 prevents the rotation of either ring-member independently of the other, but at the same time does not in any way prevent the expansion of the ring-members independently of each other. To increase the sealing effect, I may provide the ring member 11 with an annular oil-groove 20 and chamfer the edge of the ledge 16 of ring-member 12, as at 21, to provide a second oil groove. If desirable, a seal may be provided by providing a lip 22 (Figs. 6 and 9), with an inwardly projecting ledge 23 to enter a recess 24 in ring member 12, said recess being formed by cutting out the annular collar portion 18 of the said ring, as indicated in Figs. 6 and 8. In this instance, the inwardly projecting ledge 23 will overlap the gap 14 in ring-member 12.

Having described my invention, what I claim is:—

1. In a piston packing, a split ring-member having an annular channel to provide an annular ledge and an annular collar, said collar being cut away adjacent the split portion to provide a recess, a second split ring located in said channel, and an inwardly projecting ledge carried by the last named ring-member arranged for insertion in said recess when said rings are assembled.

2. In a piston packing, a split ring member having an annular channel to provide a ledge and an upstanding collar portion, said ledge being cut away at the split portion to provide a recess, said ledge being flattened adjacent the split portion, a second split ring member located in said channel, a lip carried by the second ring engaging said flattened portion, and an inwardly extending ledge carried by the lip arranged to engage the recess in the collar portion of the first named ring when said rings are assembled.

3. In a piston packing, a split ring-member having an annular channel to provide an annular ledge and an annular collar, said collar being cut away adjacent the split portion to provide a recess, a second split ring located in said channel, and an inwardly projecting ledge carried by the last named ring member arranged for insertion in said recess when said rings are assembled, said projection overlapping the first named ring member at the point where the recess is formed.

4. In a piston packing, a split ring member having an annular channel to provide an annular ledge and an annular collar, said collar being cut away adjacent the split portion to provide a recess, a second split ring located in said channel, and an inwardly projecting ledge carried by the last named ring member arranged for insertion in said recess when said rings are assembled, said projection overlapping the first named ring member at the point where the recess is formed, said ring members being unsecured together.

5. In a piston packing, a split ring member having an annular channel to provide an annular ledge and an annular collar, said collar being cut away at each side of the split portion to provide a recess, a second split ring located in said channel, and an inwardly projecting ledge carried by the last named ring-member arranged for insertion in said recess when said rings are assembled, said projection overlapping the first named ring member at the point where the recess is formed to cover the gap between the adjacent ends of the said first named ring member.

Signed at New York city, N. Y., this 24 day of September, 1919.

JOSEPH A. INGRAM.

Witnesses:
EDWARD A. JARVIS,
MAURICE BLOCK.